United States Patent
Bochard

[11] Patent Number: 5,564,498
[45] Date of Patent: Oct. 15, 1996

[54] DEVICE FOR COOLING CONTAINMENTS

[75] Inventor: Camille Bochard, Lyons, France

[73] Assignee: ROBATEL, Genas, France

[21] Appl. No.: 525,209

[22] Filed: Sep. 8, 1995

[30] Foreign Application Priority Data

Sep. 16, 1994 [FR] France .................................. 94 11407

[51] Int. Cl.$^6$ ...................................................... F28D 1/06
[52] U.S. Cl. .............. 165/169; 250/506.1; 165/DIG. 353
[58] Field of Search ............................ 165/169; 376/272, 376/295; 250/506.1, 507.1

[56] References Cited

U.S. PATENT DOCUMENTS

| | | | |
|---|---|---|---|
| 2,650,808 | 9/1953 | Cohen et al. | 165/169 X |
| 2,707,096 | 4/1955 | Koopmans | 165/169 X |
| 3,016,463 | 1/1962 | Needham | 250/506.1 |
| 4,206,312 | 6/1980 | Kuhlman | 13/32 |
| 4,634,875 | 1/1987 | Kugeler et al. | 250/506.1 |
| 4,649,018 | 3/1987 | Waltersdorf et al. | 376/272 |
| 4,672,213 | 6/1987 | Stoll et al. | 250/506.1 |
| 4,868,400 | 9/1989 | Barnhart et al. | 250/506.1 |

FOREIGN PATENT DOCUMENTS

| | | | |
|---|---|---|---|
| 3244707 | 6/1984 | Germany . | |
| 3816195 | 11/1989 | Germany | 250/506.1 |

Primary Examiner—Allen J. Flanigan
Attorney, Agent, or Firm—Dowell & Dowell

[57] ABSTRACT

A device for cooling containments, and particularly silos for storing irradiated nuclear fuels, comprising at least two rows of vertical tubes that clamps maintain applied against the wall to be cooled, the free space or housing which contains tubes being filled with a mass of a material ensuring good heat transfer. The ambient air may, by natural convection, traverse the tubes to dissipate the heat into the atmosphere.

8 Claims, 2 Drawing Sheets 5,564,498

DEVICE FOR COOLING CONTAINMENTS

BACKGROUND OF THE INVENTION

1. Field of the Invention

The present invention relates to a device for cooling containments.

2. History of the Related Art

It is known that, in certain industrial sectors, it is necessary to ensure energetic cooling of the walls of containments containing materials or substances likely to generate heat. This is more particularly the case of silos intended for storing irradiated nuclear fuels.

In many cases, such cooling is effected by heat exchange between the wall of the containment and the surrounding fluid, i.e. most often the ambient air. Simple natural convection may also be employed, but the efficiency of cooling depends directly on the contact surface between the fluid and the wall to be cooled, so that it is frequently indispensable to equip such a wall with ribs adapted substantially to increase the exchange surface. Now, in certain cases, the use of such ribs may prove inappropriate or difficult and expensive to employ.

German Patent Application No. 3244707 (VOX) discloses a system for cooling containments which employs a row of vertical tubes fixed to the outer wall of the containment with the aid of spaced clamps. This row of tubes is disposed inside an annular housing defined between the outer wall of the containment and a concentric outer envelope, and is embedded in a mass obtained by casting a hardenable material adapted to ensure good heat transfer by conduction. The ends of the tubes open out freely into the atmosphere so that they may be cooled by natural heat convection.

However, such a system appears to be fairly delicate to implement. In fact, it is necessary to reinforce the mass of cement or other material with the aid of vertical metallic reinforcements. Furthermore, in order to obtain good heat dissipation, spacers must be provided, disposed radially between the tubes, in order to connect the wall of the containment to the wall of the outer envelope, as well as perforated horizontal partitions which are traversed by the tubes and by such reinforcements.

It will be readily appreciated that these reinforcements, spacers and partitions complicate the construction of the structure and render it expensive.

It is an object of the present invention to overcome this drawback by providing a cooling device which, despite the simplicity of its production, has been proved efficient by tests.

SUMMARY OF THE INVENTION

The device according to the invention for cooling containments, particularly silos for storing irradiated nuclear fuels, is of the type comprising parallel tubes which are fixed to the outer wall of the containment with the aid of spaced clamps and are disposed inside an annular housing defined between the wall and a concentric outer envelope. The tubes embedded in a mass obtained by casting a hardenable material adapted to ensure good heat transfer by conduction, and the tubes are disposed to form at least two concentric rows.

In fact, the invention consists in providing in the annular housing at least two concentric rows of vertical tubes, which, while ensuring a good heat dissipation, at the same time reinforce the cast mass. Any reinforcement, spacers or inner partitions may thus be dispensed with.

In particularly advantageous manner, these rows of tubes are fastened in place with the aid of clamps with incompletely closed profile, of which one of the ends is welded to the outer wall of the containment for the innermost row of tubes, to the clamps of the immediately adjacent row for the other rows, while the opposite end is welded to the immediately adjacent clamp. The incompletely closed profile facilitates placing of the different rows and at the same time defines between the tubes free spaces for the passage of the mass of material cast in situ.

It will be noted that, with a view to obtaining a better reinforcement of this mass, the tubes of the successive rows are first disposed in contiguous manner, being housed in the spaces made between the tubes of the immediately inner row.

BRIEF DESCRIPTION OF THE DRAWINGS

The invention will be more readily understood on reading the following description with reference to the accompanying drawings, in which.

DESCRIPTION OF PREFERRED EMBODIMENT

Figure 1:
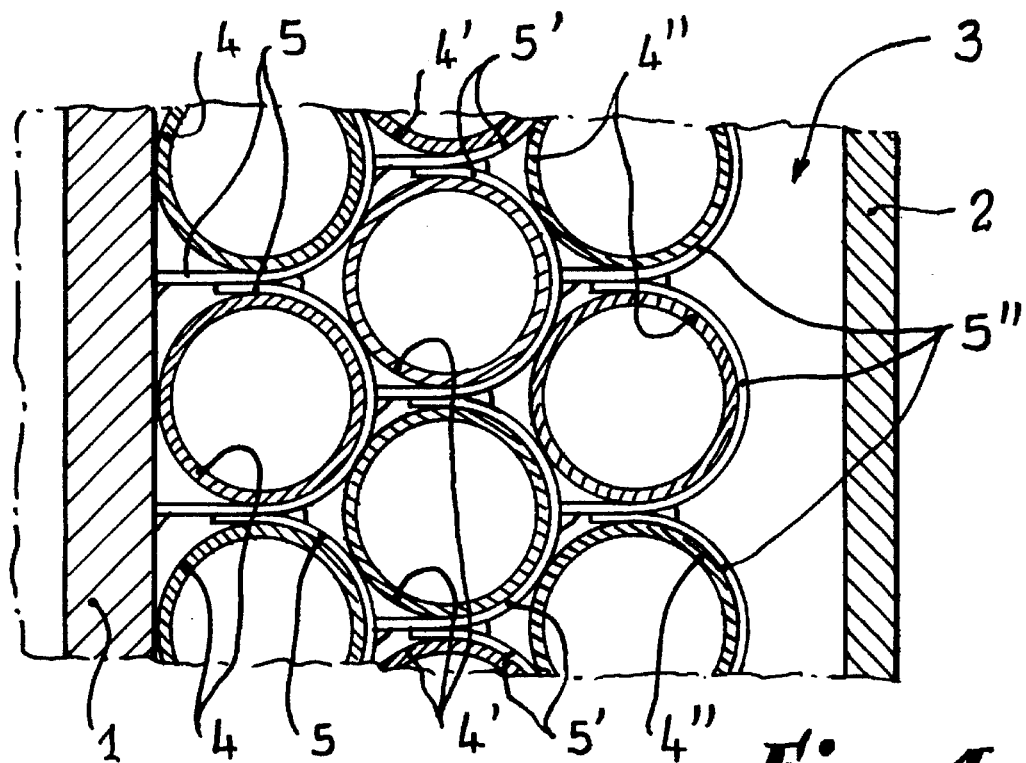
FIG. 1 is a horizontal section through a cooling device according to the invention, shown applied against the wall to be cooled before the heat-transfer mass has been cast.

Referring now to the drawings, reference 1 in FIG. 1 designates the metal wall of the containment to be cooled, such wall 1 having been supposed to be constituted by simple sheet metal of considerable thickness. Outside this wall 1 is disposed an envelope 2 which thus defines a free space or housing 3, of annular profile when the wall 1 and the envelope 2 present a circular section.

Inside this housing 3 are provided three concentric rows of tubes 4, 4', 4" made of a good heat conducting metal (copper or aluminium) which, in each row, are disposed parallel to one another along the vertical axis of the enclosure. It will be noted that the three rows of tubes are disposed in contiguous manner, the tubes of one row being housed in the spaces made by the tubes of the preceding row. Tubes 5 are fixed to the wall 1, in places, with the aid of incompletely closed clamps 5 so that one of the ends of each of them is welded to the wall 1 while the other is fixed, likewise by welding, to the immediately adjacent clamp. Tubes 4' and 4" are disposed against the clamps of the tubes of the preceding rows and fixed thereto with the aid of clamps 5', 5" identical to clamps 5 and welded to the clamps which maintain the tubes of the preceding row.

The successive rows of tubes 4, 4', 4" are, of course, fixed by welding before the envelope 2 has been placed in position to define the housing 3. It will be observed that the latter is provided to be open at its upper end and, on the contrary, closed at its lower end.

Figure 2:
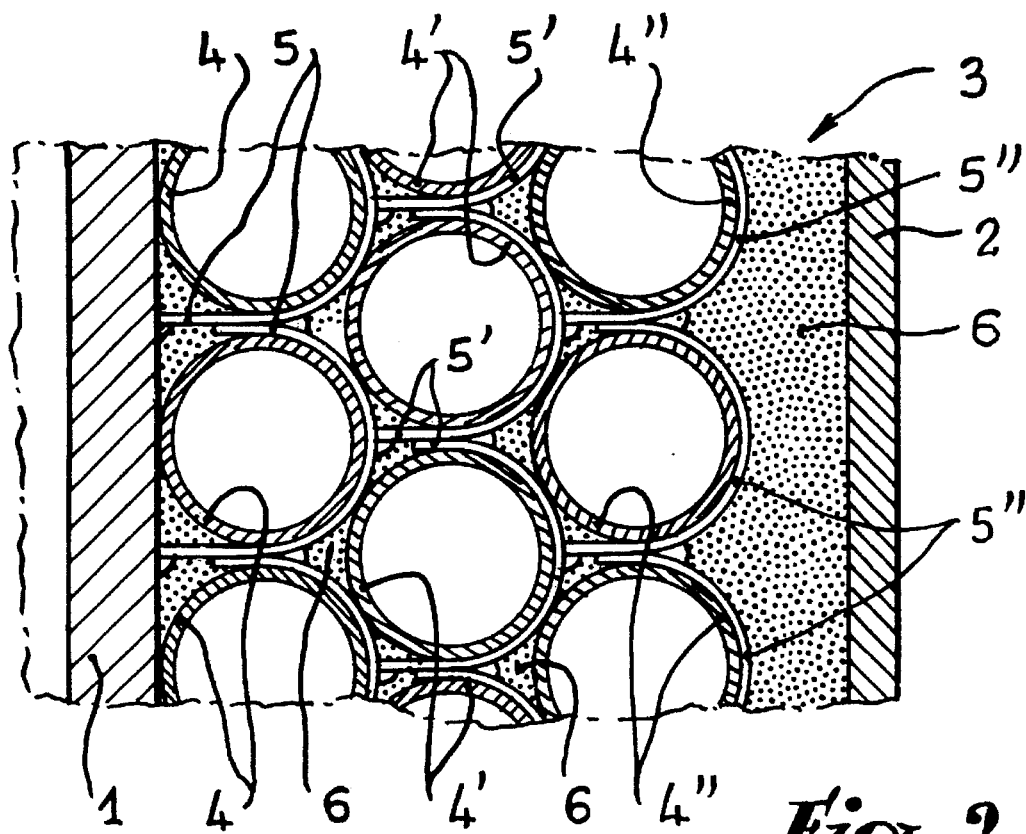
FIG. 2 reproduces FIG. 1 after this mass has been cast and hardened.

It is in housing 3 thus defined that a hardenable material adapted to ensure a good heat transfer by conduction, such as plaster or cement, is then cast. Before hardening, this material must have a sufficient castability to fill housing 3 completely, penetrating between the rows of tubes 4, 4', 4"

through the spaces made by the clamps 5, 5', 5". The mass shown at 6 in FIG. 2 is thus obtained.

It will be appreciated that the top and bottom orifices of tubes 4, 4', 4" having been left open, the ambient air may, by natural convection, traverse the tubes to ensure dissipation in the atmosphere of the heat released by the wall 1 and transmitted by conduction to the tubes.

With remarkably small dimensions, a very large exchange surface is obtained which improves the efficiency of the cooling system. Unlike the conventional fins, the fixation of the rows of tubes involves little welding and therefore avoids deformation of the wall to be cooled. Implementation is very simple and it will, moreover, be noted that the tubes of the concentric rows constitute per se reinforcements which dispense with any strengthening means.

Figure 3:
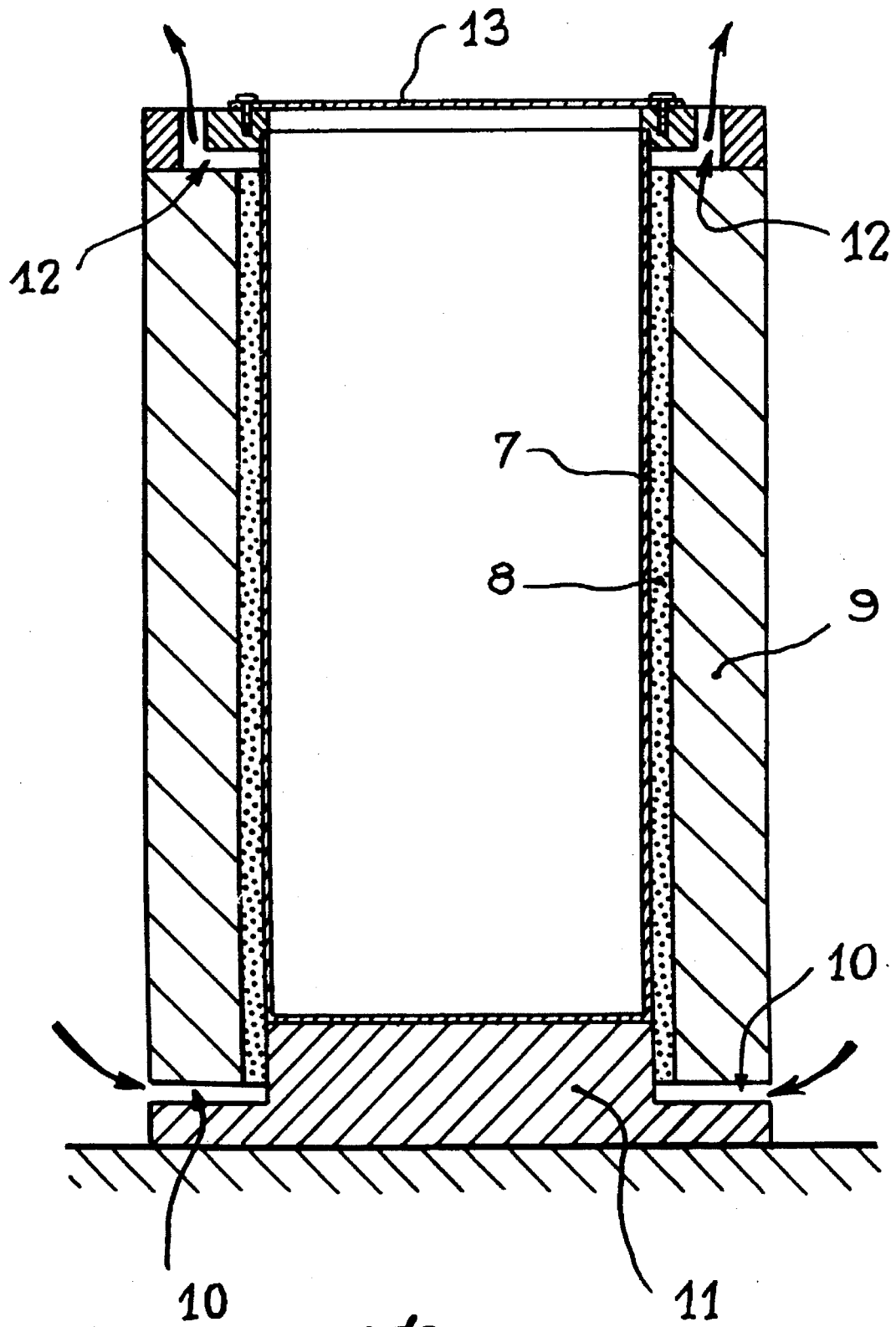
FIG. 3 is a schematic vertical section illustrating the application of the device according to the invention to a silo for storing irradiated nuclear fuel.

FIG. 3 illustrates the application of the invention to the cooling of a vertical silo for storing irradiated nuclear fuels, which constitute radioactive matter capable of releasing a residual power translated by a considerable increase of heat. It is against the outer wall of the cylindrical vessel 7 of such a silo that the assembly 8 formed by the tubes disposed in several concentric rows (the number of which depend in fact on the quantity of heat to be dissipated) and by the insulating mass within which they are embedded, is applied. The outer envelope which defines the annular housing referenced 3 in FIGS. 1 and 2 is here directly constituted by the inner wall of the conventional ring 9 made of lead, concrete or other material which ensures biological anti-radiation protection.

The ambient air penetrates inside the tubes of the assembly 8 through a lower annular vent 10 made between the base of the ring 10 and the bottom 11 of the silo. By natural convection, it circulates through the tubes, evacuating the heat released by the vessel 7 and escapes into the atmosphere through an upper vent 12 provided beneath the conventional cover 13.

It goes without saying that such circulation of air by natural convection may be improved with the aid of an appropriate blower.

What is claimed is:

1. Device for cooling containments having an outer wall of the type comprising, parallel tubes fixed to the outer wall of the containment with spaced clamps, said tubes being within a housing defined between the outer wall and a concentric outer envelope, said tube being embedded in a mass obtained by casting a hardenable material adapted to ensure good heat transfer by conduction, and said tubes being disposed to form at least two concentric rows which are hydraulically connected in parallel.

2. The device of claim 1, wherein the rows of tubes are fixed with first and second clamps each having an incompletely closed profile, said first clamps having one end welded to the outer wall and an opposite end extending partially around an adjacent tube of an innermost row of tubes, said opposite end of said first clamps being welded to an immediately adjacent first clamp, and said second clamp having one end welded to an adjacent first clamp and an opposite end extending partially around an adjacent tube of an outer row of tubes and being welded to an adjacent second clamp.

3. The device of claim 2, wherein the tubes of the outer row are disposed in contingous manner in spaces defined between the tubes of said innermost row of tubes.

4. The device of claim 1, wherein said housing is annular.

5. The device of claim 4, wherein the tubes of one of said at least two concentric rows of tubes are disposed in contingous manner in spaces defined between the tubes of the other of said at least two concentric rows of tubes.

6. A device for cooling a containment silo for storing irradiated nuclear fuels of a type comprising, parallel tubes fixed to the outer wall of the containment with spaced clamps, said tubes being within an annular housing defined between the outer wall and a concentric outer envelope, said tubes being embedded in a mass obtained by casting a hardenable material adapted to ensure good heat transfer by conduction, and said tubes being disposed to form at least two concentric rows which are hydraulically connected in parallel.

7. The device of claim 6, wherein said housing is annular.

8. The device of claim 7, wherein the rows of tubes are fixed with first and second clamps each having an incompletely closed profile, said first clamps having one end welded to the outer wall and an opposite end extending partially around an adjacent tube of an innermost row of tubes, said opposite end of said first clamps being welded to an immediately adjacent first clamp, and said second clamp having one end welded to an adjacent first clamp and an opposite end extending partially around an adjacent tube of an outer row of tubes and being welded to an adjacent second clamp.

\* \* \* \* \*